United States Patent [19]

Greenfield, Jr. et al.

[11] 4,245,680
[45] Jan. 20, 1981

[54] FOOD SERVICE BEVERAGE DISPENSER

[76] Inventors: Irving E. Greenfield, Jr., 5331 SW 92nd Ave., Miami, Fla. 33156; Ronald C. Jacobson, 14500 Kendale Lakes Blvd., Miami, Fla. 33183

[21] Appl. No.: 56,285

[22] Filed: Jul. 10, 1979

[51] Int. Cl.³ .............................................. B65B 3/04
[52] U.S. Cl. .................................. 141/82; 141/104; 141/284; 222/132; 222/144.5; 222/145; 222/160
[58] Field of Search ................... 222/52, 132, 142.3, 222/144.5, 145, 146 R, 146 HE, 160; 141/104, 82, 1, 2, 5, 9, 11, 18, 69–81, 100, 102, 103, 105, 106, 107, 85, 89, 92, 284, 231–233

[56] References Cited

U.S. PATENT DOCUMENTS 2,771,914  11/1956  Pinney ................................ 141/104

Primary Examiner—Houston S. Bell, Jr.
Attorney, Agent, or Firm—Clarence A. O'Brien; Harvey B. Jacobson

[57] ABSTRACT

Automatic dispensing apparatus for dispensing predetermined quantities of different beverages from one dispensing station, the invention comprises a housing having a water supply subsystem located therein for supplying either hot or cold water to the dispensing station for ejection into a cup, the housing further having a plurality of dry powder beverage base containers, each container having a powder metering mechanism for ejecting a predetermined quantity of powder into a delivery chute, the delivery chute directing the powder into the cup for mixing with the hot or cold water. Portions of the powder metering mechanisms remote from the containers and upper portions of the delivery chutes, one delivery chute being provided for each container to avoid cross-contamination, are disposed within a warm air enclosure to prevent moisture contamination of the dry powders. A warm air flow subsystem heats the warm air enclosure and, by producing a positive pressure therein relative to ambient pressure at the lower ends of the delivery chutes, prevents the movement of moisture-laden air upwardly through the delivery chutes into contaminating contact with the container and the dry powders contained therein.

16 Claims, 6 Drawing Figures

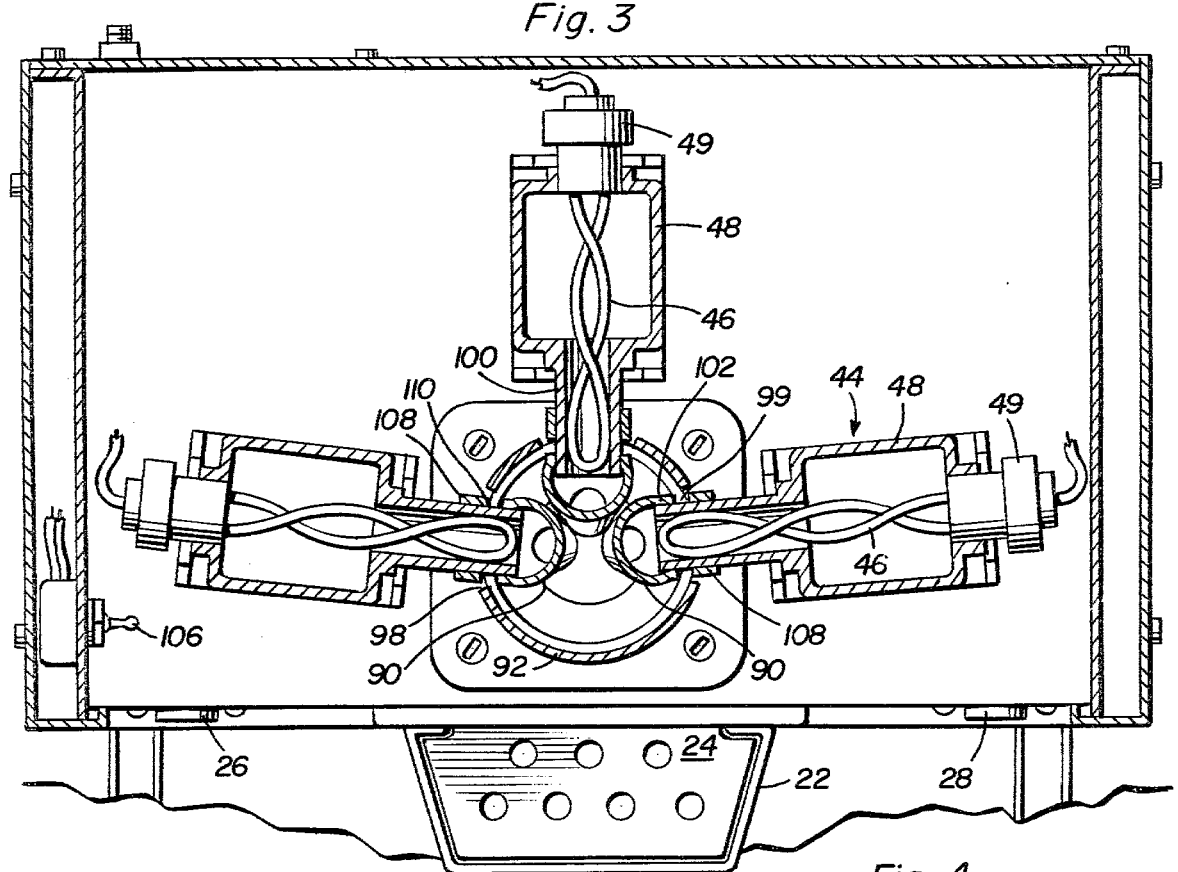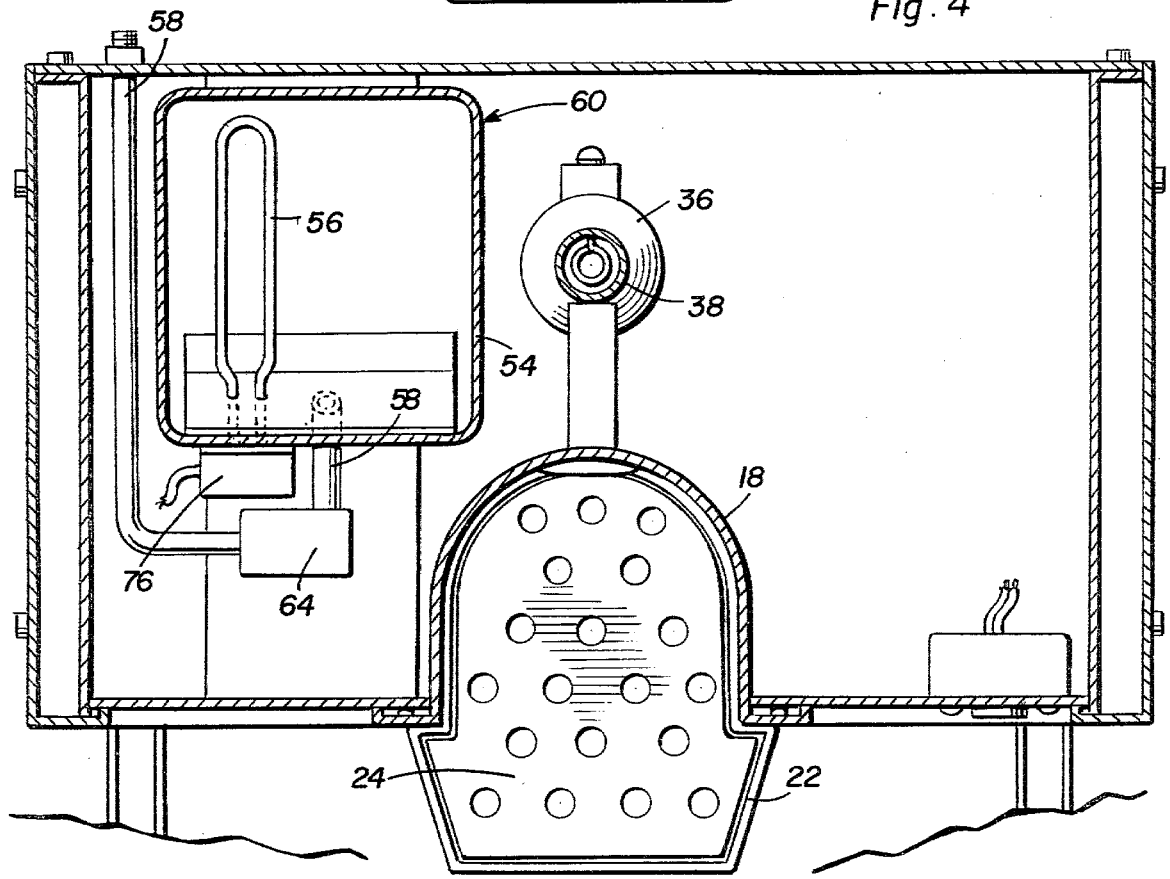

FOOD SERVICE BEVERAGE DISPENSER

BACKGROUND OF THE INVENTION

1. Field of the Invention

The present invention relates generally to the dispensing of hot beverages wherein a dry beverage base and a reconstituting medium therefor is mixed in a use container, the invention more particularly relating to an apparatus for dispensing a plurality of different beverages at a single dispensing station without product cross-contamination or contamination of the dry beverage bases by moisture and other contaminating elements.

2. Description of the Prior Art

Apparatus capable of dispensing dry beverage base powders selectively into a cup for mixing therein with water also discharged into the cup by the apparatus are known in the art. The prior art further encompasses the provision of warm air circulation within a dry discharge apparatus for preventing hardening or moisture absorption by the powder material. The prior art further provides powder metering mechanisms, such as discharge augers, capable of discharging a predetermined quantity of a dry powder into a mixing container. The following U.S. Pat. Nos. are exemplary of the prior art: 2,755,000, 3,364,959, 2,954,145, 3,531,019, 3,088,490 3,671,020, 3,195,588.

The prior art does not provide the particular combination of structural elements provided by the present apparatus, the present apparatus providing structure for accomplishing similar functions but which, by the particular nature of such structure, produces such similar functions in a dissimilar manner, the structure of the present apparatus being not heretofore available in or contemplated by the prior art. In particular, the present apparatus is capable of dispensing a plurality of dry beverage base powders selectively into a use container for mixing therein with a solvent or extraction medium, the particular structure of the present apparatus allowing high volume use thereof, the apparatus having a relatively large storage capacity for the several dry powders dispensed therefrom. Further, the stored dry powders dispensed by the present apparatus are maintained by the apparatus without contamination due either to environmental contamination, such as by moisture, oxygen, and the like, or by contamination with other dry powders stored within said apparatus.

SUMMARY OF THE INVENTION

The present dispensing apparatus is particularly intended for use in "on-floor" pantries of institutions, such as hospitals, which employ convenience food systems complimentary to or in place of a central kitchen. In such "on-floor" pantries, a hot beverage is typically prepared in the pantry and served with a meal which has been reconstituted or heated in the pantry after supply from a central kitchen. It is particularly desirable to prepare hot beverages in an "on-floor" pantry immediately before serving of the beverage to the user, such procedure reducing heat loss from the beverage, taste deterioration of the beverage, and associated problems. Existing dispensing apparatus suitable for such uses typically only dispense coffee and hot water, such devices utilizing mixing chambers internally of the apparatus and thereby being susceptible to the sanitation and malfunction problems associated with such apparatus. Separate dispensing apparatus for supplying the other beverages typically served in such situations can not economically and conveniently be provided. Therefore, it is desirable to provide a dispensing apparatus capable of dispensing a plurality of different beverages from one dispensing station, it being necessary to avoid contamination of a given beverage so dispensed with any of the other beverages dispensed by the apparatus. The present invention provides such an apparatus capable of dispensing a plurality of different beverages without contamination of any one of same by any of the other beverages so dispensed. The present dispensing apparatus particularly provides for selective dispensing of any one of a plurality of dry beverage base powders stored within the apparatus, the powder and a reconstituting liquid or extraction medium being discharged into a use container for mixing therein. The present apparatus is, therefore, capable of dispensing beverages such as coffee, tea, decaffeinated coffee, or hot water, as desired. The present apparatus comprises water and powder delivery subsystems capable of the rapid recycling necessary in a high volume use environment. Although the present apparatus is capable of dispensing a plurality of different beverages from a single dispensing station, cross-contamination of the beverage products is prevented through the use of separate structure for delivering each dry beverage base powder into the use container, the delivery structure being configured to avoid accidental and un-intended contamination of any given dry beverage base powder with any other such powder contained within the apparatus. The present apparatus further includes a warm air enclosure defined by a shroud which encloses at least portions of the dry beverage base powder delivery structure. The warm air enclosure or shroud acts to protect the dry beverage base powders contained within the apparatus from contamination by moisture or other contaminants, the enclosure being warmed by a warm air flow subsystem which also acts to produce a positive pressure within the enclosure. The present apparatus further comprises a unitary closure lid capable of closing the separate dry beverage base powder storage containers housed within the apparatus, thereby to prevent contamination of the powders by moisture, oxygen, or the like.

Accordingly, it is an object of the present invention to provide apparatus capable of dispensing a plurality of different beverages from a single dispensing station without cross-contamination of the beverages and without contamination of the beverages by substances contained in the ambient environment of the apparatus.

It is another object of the invention to provide an apparatus capable of dispensing a plurality of different beverages and having warm air circulation and containing structure capable of preventing the incursion of moisture into storage containers containing the dry beverage base powders used to make up the different beverages dispensed by the apparatus, said structure preventing "caking" or hardening of the powders due to moisture absorption.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a section taken along line 3—3 of FIG. 1;

FIG. 4 is a section taken along line 4—4 of FIG. 1;

DESCRIPTION OF THE PREFERRED EMBODIMENTS

Figure 1:
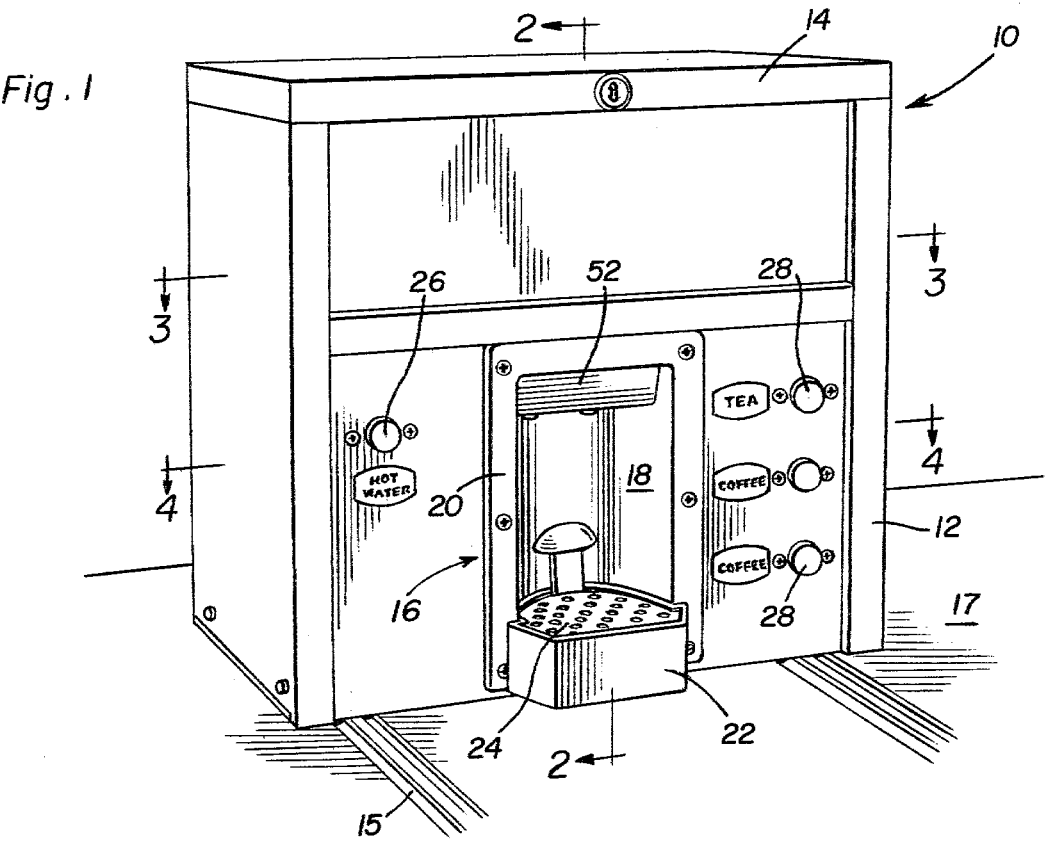
FIG. 1 is a perspective view illustrating the present dispensing apparatus and particularly the housing and output portions thereof.

Referring now to the drawings and particularly to FIG. 1, a dispensing apparatus according to the present invention is shown generally at 10 to comprise a generally box-like housing 12 having a housing closure 14 removably mounted to the upper portion thereof for access into the interior of said housing. The apparatus 10 is seen to be conveniently disposable on a service shelf. A dispensing station 16 is seen to be provided in an external face of the housing 12, the dispensing station 16 being also shown in FIGS. 2 and 4 to comprise a splash guard 18 of substantially semi-cylindrical conformation, the splash guard 18 having a perimetric flange 20 for mounting said guard 18 to adjacent surface portions of the face of the housing 12. The dispensing station 16 further comprises a platform 22 having a perforated drain plate 24 disposed thereover, a use container 35 or cup into which a beverage is to be dispensed being disposable on the drain plate 24 in a position suitable for dispensing of a dry beverage base powder and a reconstituting liquid or extraction medium into the container for mixing therein. A hot water selector 26 and dry beverage base powder selectors 28, which selectors can comprise "push" buttons, are positioned on the face of the housing adjacent the dispensing station 16. Activation of a product selector 28 provides both the necessary powder and water for preparation of a desired beverage while the hot water selector 26 will deliver only hot water when required for other dietary purposes.

Figure 5:
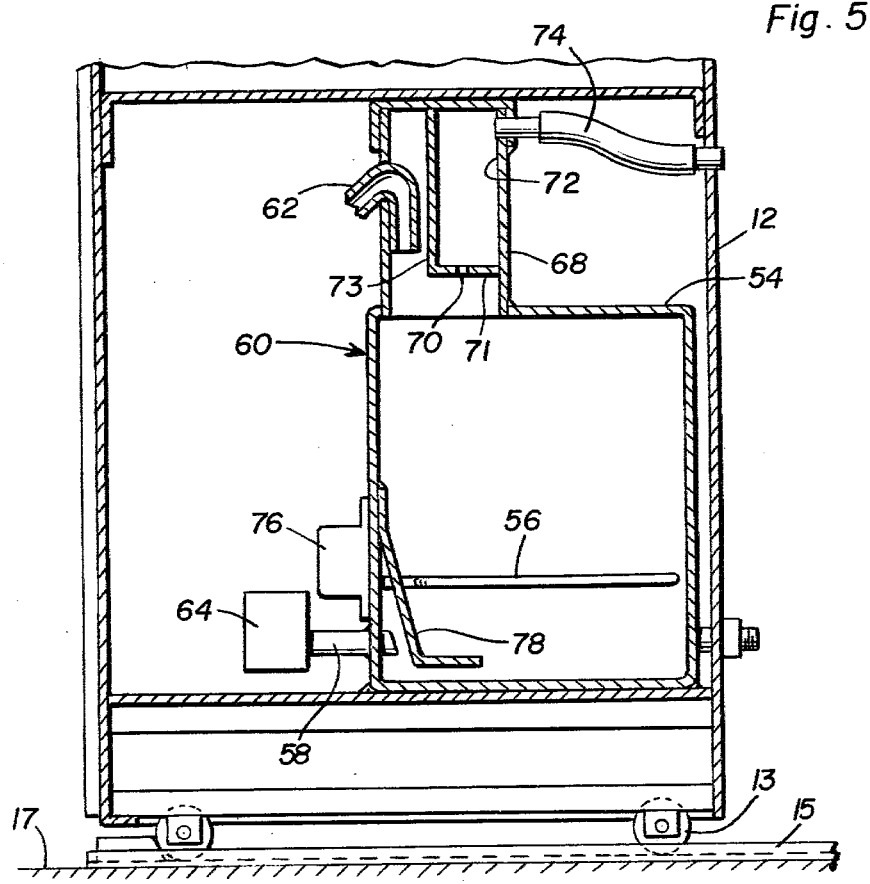
FIG. 5 is an idealized section of a portion of the present apparatus particularly illustrating the water supply subsystem of the apparatus.
Figure 2:
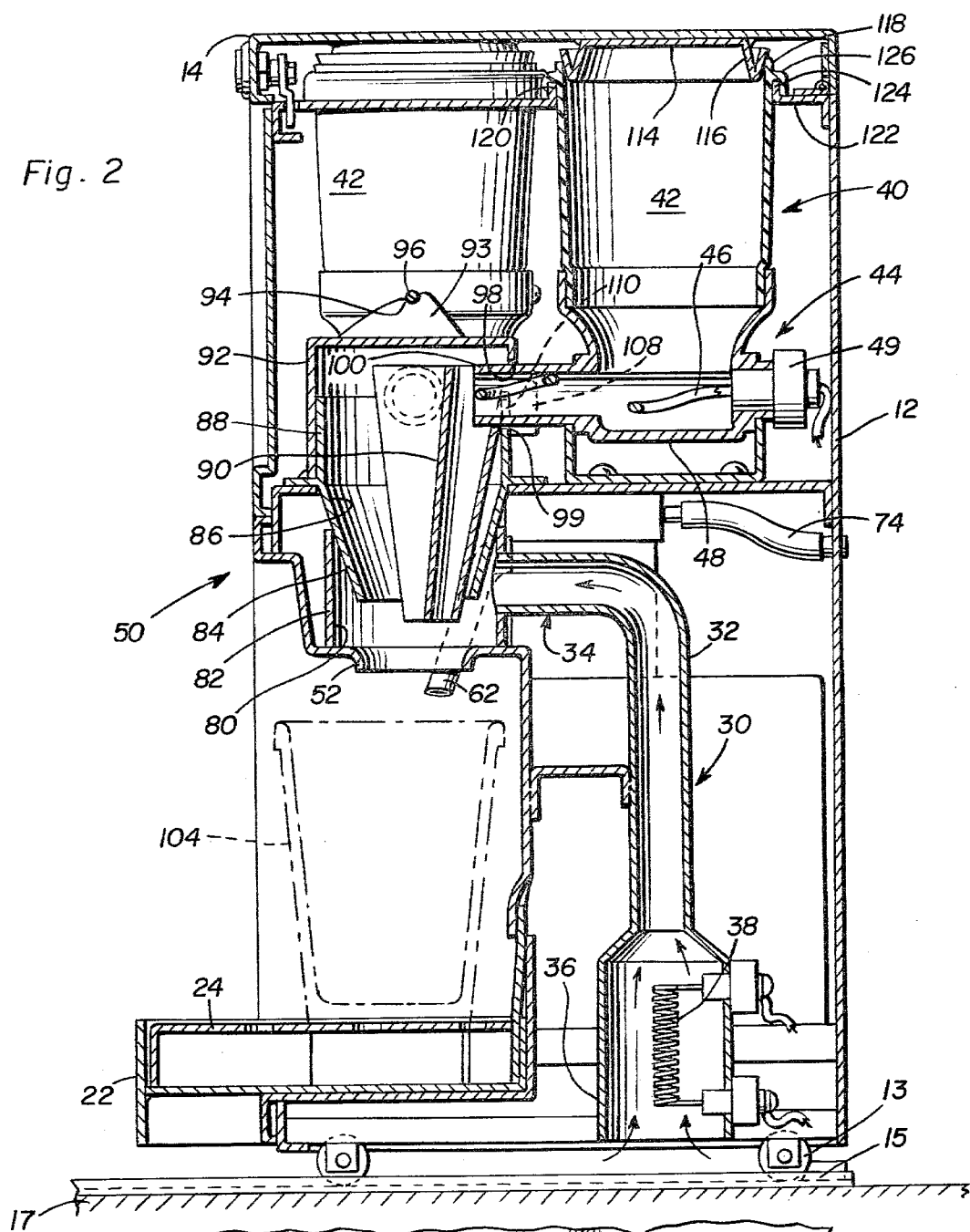
FIG. 2 is a section in elevation taken along line 2—2 of FIG. 1.

Referring now particularly to FIG. 2, the housing 12 is seen to contain a warm air flow subsystem shown generally at 30, a dry beverage base powder containing and dispensing subsystem shown generally at 40, a dry beverage base powder delivery subsystem shown generally at 50, and, as shown in FIGS. 4 and 5, a water supply subsystem shown generally at 60. The warm air flow subsystem 30 is seen to comprise a convection tube 32 which can be L-shaped to provide a horizontally directed output at 34 of warm air heated within an air inlet chamber 36 by a resistance heating element 38, air being drawn into the air inlet chamber 36 from externally of the housing 12 to be heated in a known fashion by the heating element 38. Warm air exiting the chamber 36 rises through the convection tube 32 and is directed into a primary warm air chamber 80 defined by a cylindrical chamber housing 82. A lower end portion of a conical housing 84 extends into the chamber 80 through an upper end portion of the housing 82, the conical housing 84 partially defining a secondary warm air chamber 86 in cooperation with a substantially cylindrical upper housing portion 88 formed unitarily with the conical housing 84. A plurality of delivery chutes 90 are disposed within the secondary warm air chamber 86, lower end portions of the chutes 90 extending from the lower open end of the conical housing 84 and into the primary warm air chamber 80. A cover 92 of substantially cylindrical conformation is seen to be open at the lower end thereof and closed at the upper end, the cover 92 being received over the cylindrical upper housing portion 88 to further define the secondary warm air chamber 86. The cover 92 is provided with a diametric upstanding plate 93 on the upper closed end portion thereof with the upper edge being arcuate and provided with a notch 94. A pivotal U-shaped fastening member 96 is mounted on an interior structural portion of the housing 12 and engages notch 94 for releasably holding the cover 92 in place over the cylindrical upper housing portion 88.

The cover 92 and the housing portion 88 have cutout portions 98 and 99, respectively, which align to allow extension of free end portions of auger-containing delivery tubes 100, said free end portions of said delivery tubes 100 further extending into the secondary warm air chamber 86 through a cutout portion 102 in each of the delivery chutes 90. Containers 42 store the dry beverage base powders dispensed by the apparatus 10 into the use container shown in phantom at 104 in FIG. 2. Each of the containers 42 contains a dry powder useful as a beverage base for producing a given beverage when mixed with a suitable liquid in the use container 104. A powder metering mechanism 44 is provided beneath each of the containers 42, the metering mechanism 44 preferably comprising a motor-driven auger 46 such as can be better seen in FIG. 3. Each auger 46 is housed within an auger housing 48, which auger housing 48 communicates at one end with one each of the delivery tubes 100, each auger 46 extending into the interior of each of the delivery tubes 100. At the other ends of the auger housings 48, electrically driven motors 49 are mounted for power rotation of the augers 46 on selection of the appropriate dry beverage base powder selectors 28, said selectors 28 being electrically connected through appropriate electrical relays to the motors 49.

As can be particularly seen in FIG. 2, the interior of each of the containers 42 communicates with the interior of the auger housing 48 surmounted by said containers 42, dry beverage base powders contained within the containers 42 being gravity fed into said auger housings 48. Therefore, on actuation of one of the augers 46, a quantity of the dry beverage powder contained within the surmounting container 42 is caused to be displaced into the associated delivery tube 100 and dispensed from the end of said tube 100 into the associated delivery chute 90. The dry powder thus dispensed into the delivery chute 90 is gravity-fed from the lower end of said chute 90 through output nozzle 52 disposed beneath and aligned with the lower ends of the delivery chutes 90, the dry powder being thereby discharged into the use container 104. As will be described hereinafter, liquid discharged into the use container 104 for mixing with the dry beverage base powder dispensed as indicated hereinabove exits the water supply subsystem 60 through a conduit 62, the free end of which extends through the output nozzle 52 into surmounting relation to the use container 104. As can further be seen in FIG. 2, the upper ends of the delivery chutes 90 extend above the delivery tubes 100 to prevent accidental discharge of dry powder from any one of the delivery tubes 100 into any one of the delivery chutes 90 not immediately associated with said delivery tube 100. As can further be seen in FIG. 2, each delivery chute 90 has a tab member 108, a notch 110 being formed between the body of the delivery chute 90 and the tab member 108, the notch 110 receiving a wall segment of the cylindrical upper housing portion 88 thereinto to suspendibly mount the delivery chutes 90 within the chamber 86.

The warm air exiting the convection tube 32 causes the temperature in the primary warm air chamber 80 to be approximately 50 degrees F. over ambient temperature. The heated air within the primary chamber 80 heats the lower ends of the delivery chutes 90 and further heats the conical housing 84 and upper housing portion 88 to provide a temperature within the secondary warm air chamber 86 of approximately 10 degrees F. over ambient. The flow of warm air through the primary chamber 80 also provides a positive pressure within the secondary chamber 86, ambient air having moisture or other contaminant present therein being therefore prevented from moving into the secondary chamber 86 through the opening in the lower portion of the conical housing 84 through which the lower ends of the delivery chutes 90 extend. The structure thus described provides a temperature gradient between the lower ends of the delivery chutes 90 and the upper ends thereof, the delivery tubes 100 extending into the second chamber 86 and usually containing dry beverage base powder therewithin being at a lower temperature than the temperature within the primary chamber 80 to prevent deterioration of said powder. As can further be seen in FIG. 3, an auger shut-off switch 106 is provided to prevent dispensing of the dry beverage base powders contained within the containers 42 during periods when the apparatus 10 is unattended. As can further be seen in FIG. 3, the delivery chutes 90 are preferably formed substantially as frusto-conical sections, the upper ends of the chutes 90 being of a larger diameter than are the lower ends of said chutes.

Figure 6:
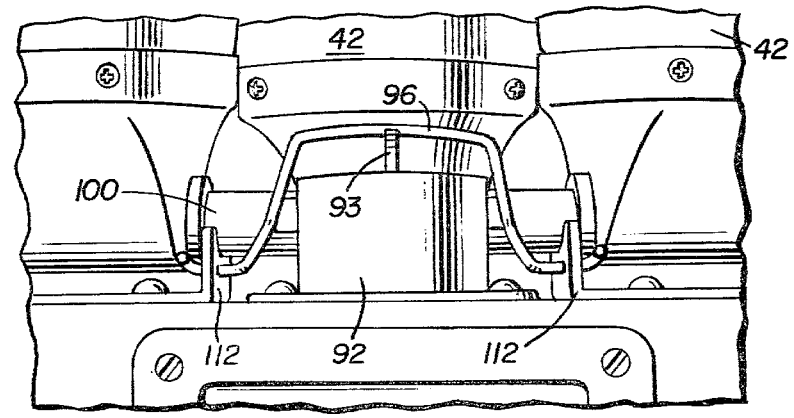
FIG. 6 is a perspective of a detailed portion of the apparatus particularly illustrating a warm air shroud enclosing portions of the dry powder delivery mechanisms of the apparatus.

Referring now to FIG. 6, the cover 92 can be seen in detail to be held over the secondary chamber 86 by the fastening member 96, free ends of the fastening member 96 being mounted for rotation by means of fixed mounting tabs 112 attached to interior structural portions of the housing 12. Referring once again to FIG. 2, the perforated drain plate 24 is seen to be spaced from planar interior portions of the platform 22, said interior portions of the platform 22 comprising a spillage reservoir which may be connected to a drain (not shown), water spilled within the confines of the platform 22 flowing through the apertures in the plate 24 and into the reservoir portion of the platform 22 for containment therein. The reservoir portion of the platform 22 is intended to be of sufficient volumetric capacity to contain at least a full single discharge of water from the conduit 62.

Referring now particularly to FIGS. 4 and 5, the water supply subsystem 60 is seen to comprise a hot water storage tank 54 having a heater element 56 disposed therein, the heater element 56 being thermostatically controlled in a known manner. Relatively cold water is supplied to the tank 54 from externally of the housing 12 through a water inlet supply line 58 having an inlet valve 64 disposed in said line 58 for controlling the flow of water into the tank 54. As water enters the tank 54 through the supply line 58, heated water is caused to rise in a riser tube 68 until a syphon tube 62 is caused to be primed. At this point, the hot water flowing out of the syphon tube 62 equals the cold water entering the tank 54 through the supply line 58 except for a small portion of water which flows through a make-up orifice 70 through a lower wall portion 71 of a make-up reservoir 72 defined by partition 73 located within riser tube 68. When the valve 64 is closed, hot water will continue to be run until the water in the riser tube 68 is below the inlet of the syphon tube 62, at which time the heater element 56 can be activated to cause the water in the tank 54 to expand and rise within the riser tube 68. Water entering the make-up reservoir 72 through the orifice 70 is maintained therein until needed to make-up water lost through evaporation such as occurs during extended inoperative periods. Effectively, the use of a relatively small riser tube 68 results in a very short elapsed time between the opening of the inlet valve 64 and the flow of hot water through the syphon tube 62. Further, the present structure provides a relatively short time between the opening of the inlet valve 64 and the discontinuation of flow through the syphon tube 62 while maintaining a large capacity with the ability to provide a rapid "first drink response" due to the presence of make-up water within the make-up reservoir 72. A vapor relief tube 74 is vented to ambient through the housing 12. A thermostat 76 is seen to control actuation of the heater element 56. Further, a deflector 78 acts to maintain the relatively cold water entering the tank 54 in the lower portions of said tank 54 on entry of the water into said tank.

Referring again to FIG. 2, the housing closure 14 is seen to have lids 114 for each of the containers 42 permanently attached thereto, the lids 114 being formed of a flexible plastic material. The lids 114 are each seen to have an upwardly extending annular flange 116 formed thereon, the flanges 116 abutting and sealing with perimetric upper edge portions 118 of the containers 42. It is to be understood that the containers 42, and thus the lids 114, can be formed in a square, rectangular, cylindrical, or other cross section as desired. The containers 42 are seen to extend at the upper ends thereof through openings 120 formed in a deck plate 122 comprising an upper internal structural portion of the housing 12. Vertically oriented flange members 124 are disposed about perimetric edges of the openings 120. The containers 42 are seen to have downwardly extending flange members 126 formed about the upper portions thereof and extending from the exterior surfaces of said containers 42, the flange members 124 being received within a recess defined by the flange members 126 and external surfaces of the upper portions of the containers 42 spaced from said flange members 126. Therefore, the mating flange members 124 and 126 effectively seal the openings 120 to prevent spillage of dry beverage base powder into the interior of the apparatus 10 when the containers 42 are filled with said dry powders. Accordingly, all of the containers 42 are exposed for inspection and refilling on opening of the housing closure 14, closing of the housing closure 14 bringing the lids into closing relation with the containers 42 in a single movement.

Since this dispenser will be used in hospital pantries, it will most likely be mounted beneath a shelf between adjacent equipment or articles thus necessitating that the dispenser be moved forwardly for refilling the canisters or for other service. In order to accommodate such movement, the water supply is through a metal reinforced flexible tube rather than standard copper tubing which will break when repeatedly bent.

Also, a limited direction wheel system is provided for facilitating outward and inward movement of the dispenser. The wheels 13 have a brake (not shown) which renders the wheels immobile when the dispenser is in use. The tracks 15 support the dispenser on a support surface of lower shelf 17. Slides similar to conventional drawer slides may also be used to support the dispenser beneath a shelf, on a counter top or any other surface such that lateral movement will be prevented thereby preventing pinched fingers when moving the dispenser in relation to a pantry shelf or the like.

The product strength (ratio of product to water) adjustments are made by altering the auger rather than the time cycle and there is only one cold beverage selection and two hot beverage selections which enables a unique control circuit to be used. One hot beverage selection is active when the unit is at rest so that when the push button is depressed, a hot beverage will be dispensed. This reduces the control problem to selection between one hot and one cold beverage as the water select relay is normally in the hot water mode. The cold beverage selection push button actuates a second relay which deenergizes the hot water select relay to enable tap water to flow directly to the use container thus enabling the control arrangement to use only two relays or relay switches (not shown) to provide four selections with each push button also operating a timer for controlling the product motor or coil.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. Apparatus for selectively dispensing one of a plurality of dry beverage base powders contained within the apparatus and a liquid reconstituting or extraction medium into a use container, comprising:
    a housing having a single dispensing station located thereon for carrying the use container;
    liquid supply means for dispensing water into the use container;
    a plurality of containers, each of the containers storing a separate dry beverage base powder;
    dry powder metering and dispensing means disposed beneath each container for dispensing a predetermined quantity of dry beverage base powder into surmounting relation to the dispensing station;
    first chamber defining means for defining a first chamber surmounting and communicating with the dispensing station;
    second chamber defining means for defining a second chamber surmounting and communicating with the first chamber, the metering and dispensing means extending into the second chamber;
    warm air flow means for directing a flow of relatively warm air into the first chamber, said flow means preventing ambient air from entering the second chamber, said flow means further warming the first chamber and the second chamber, the first chamber being warm relative to the second chamber; and,
    chute means for carrying dry powder dispensed by said metering and dispensing means through said first and second chambers and into the use container, upper end portions of the chute means being disposed in the second chamber and lower end portions of the chute means being disposed in the first chamber.

2. The apparatus of claim 1 wherein the second chamber defining means comprise a lower housing member open at upper and lower ends thereof, the lower end extending into the first chamber, and a cover member open at a lower end and closed at an upper end thereof, the cover member being removably received over the lower housing member to define the second chamber, and means for releasably retaining the cover member on the lower housing member, the cover member and lower housing member having aligned cutout portions through which extend free end portions of the dry powder metering and dispensing means associated with each container into the second chamber for discharge of the dry beverage base powder stored respectively within each container into said second chamber.

3. The apparatus of claim 2 wherein the chute means comprise individual chute members having cutout portions at the upper ends thereof, free end portions of each dry powder metering and dispensing means extending into the cutout portion of the chute member respectively facing each said metering and dispensing means for discharge of dry powder thereinto, the lower ends of the chute members extending into the first chamber and into surmounting relation to the dispensing station.

4. The apparatus of claim 1 wherein the liquid supply means comprise:
    a tank mounted within the housing;
    heating means extending into the tank for heating water contained therein;
    means for supplying water into the tank;
    a vertical riser tube surmounting the tank and communicating with the interior thereof;
    a make-up reservoir contained within the riser tube and having an orifice formed in the lower wall thereof; and,
    a siphon tube having an anterior end thereof disposed in the riser tube externally of the make-up reservoir and a free end thereof extending from the riser tube into surmounting relation to the dispensing station for discharge of water from the riser tube into the user container when the syphon tube is primed by water entering the tank and riser tube.

5. The apparatus of claim 1 wherein the dry powder metering and dispensing means comprises:
    an auger disposed beneath each container;
    means for driving each auger;
    a housing means for containing each auger, said housing means respectively communicating with the interior of each container to receive dry powder thereinto for contact with said auger, the housing means each including a delivery tube at a free end thereof, the auger extending into said delivery tube to displace dry powder therethrough and discharge said dry powder from the free end thereof into the chute means within the second chamber.

6. The apparatus of claim 1 wherein the warm air flow means directs a substantially horizontal flow of warm air into the first chamber.

7. The apparatus of claim 1 and further comprising a closure member mounted for movement on an upper portion of the housing, lids attached to the closure member for closing each of the containers, the lids having flanges extending perimetrically therefrom to abut and seal the container.

8. The apparatus of claim 1 and further comprising a plate member having openings therein for receiving upper portions of the containers respectively thereinto, the plate member being carried by the housing and having upwardly extending flanges disposed about the periphery of each of the openings, the containers having downwardly extending flanges disposed on the outer surfaces thereof to define recesses between outer surfaces of the containers and the downwardly extending flanges, the upwardly extending flanges on the plate member being received respectively within the recesses to seal upper portions of the housing from lower portions thereof thereby to prevent dry powder from inadvertently entering lower portions of the housing on filling of the containers.

9. The structure as defined in claim 1 together with a switch means located internally of the housing for rendering said metering and dispensing means inoperative when in "off" position without altering the function of the liquid supply means.

10. The structure as defined in claim 4 wherein said water supplying means includes a pipe and valve controlling water inflow into the tank, and means manually controlling said valve to supply hot or tap water to the use container even if the powder metering and dispensing means is inoperative.

11. The structure as defined in claim 1 wherein each dry powder metering and dispensing means includes an independent manually actuated control means thereby enabling selection of one of a plurality of products to be dispensed at the single dispensing station.

12. The structure as defined in claim 11 wherein the selected product is dispensed directly into the use container without being mixed in a mixing chamber.

13. The structure as defined in claim 1 together with means supporting said housing for guided outward and inward relation to a supporting structure.

14. The structure as defined in claim 13 wherein said supporting means includes a limited direction wheel system and guide means therefor for movement forwardly and backwardly beneath a shelf to prevent lateral movement in relation to adjacent equipment thereby preventing pinched fingers and reducing problems encountered in supplying electrical energy and water to the apparatus.

15. The structure as defined in claim 11 wherein said manually actuated control means includes a plurality of electrical switches accessible externally of the housing and a circuit including less relays than selection possibilities.

16. The structure as defined in claim 15 wherein four selections can be made with two relays.

* * * * *